United States Patent
Egendorf

(10) Patent No.: US 8,326,756 B2
(45) Date of Patent: Dec. 4, 2012

(54) INTERNET BILLING METHOD

(75) Inventor: Andrew Egendorf, Lincoln, MA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 13/306,165

(22) Filed: Nov. 29, 2011

(65) Prior Publication Data

US 2012/0072308 A1 Mar. 22, 2012

Related U.S. Application Data

(63) Continuation of application No. 13/031,461, filed on Feb. 21, 2011, now Pat. No. 8,086,532, which is a continuation of application No. 11/928,733, filed on Oct. 30, 2007, now Pat. No. 7,917,436, which is a continuation of application No. 11/397,204, filed on Apr. 4, 2006, now abandoned, which is a continuation of application No. 10/238,762, filed on Sep. 10, 2002, now abandoned, which is a continuation of application No. 09/975,839, filed on Oct. 11, 2001, now Pat. No. 6,976,008, which is a continuation of application No. 09/568,925, filed on May 11, 2000, now Pat. No. 6,351,739, which is a continuation of application No. 09/057,230, filed on Apr. 8, 1998, now Pat. No. 6,188,994, which is a continuation of application No. 08/499,535, filed on Jul. 7, 1995, now Pat. No. 5,794,221.

(51) Int. Cl.
*G06Q 40/00* (2012.01)

(52) U.S. Cl. .............................................. 705/40; 42/44

(58) Field of Classification Search .................... 705/40, 705/42, 44

See application file for complete search history.

(56) References Cited

U.S. PATENT DOCUMENTS

| | | | |
|---|---|---|---|
| 2,769,023 | A | 10/1956 | Loew |
| 3,573,747 | A | 4/1971 | Adams |
| 3,652,795 | A | 3/1972 | Wolf |
| 3,920,908 | A | 11/1975 | Kraus |
| 4,709,418 | A | 11/1987 | Fox |
| 4,799,156 | A | 1/1989 | Shavit |
| 5,019,963 | A | 5/1991 | Alderson |
| 5,146,491 | A | 9/1992 | Silver |

(Continued)

FOREIGN PATENT DOCUMENTS

EP 0913789 12/2003

(Continued)

OTHER PUBLICATIONS

"First Virtual Bank of Cyberspace", Newsbytes News Network, Oct. 28, 1994, see pp. 1-2, see entire document.

(Continued)

*Primary Examiner* — Daniel Felten

(74) *Attorney, Agent, or Firm* — Guntin Meles & Gust, PLC; Andrew Gust

(57) ABSTRACT

A system that incorporates teachings of the present disclosure may include, for example, identifying a consumer account managed by a service provider to which purchases are chargeable, the identification of the account based on transactional information, enabling customer equipment to request a purchase of an electronically-purchasable item of a vendor via network equipment of the service provider, wherein the vendor is a party other than the service provider, charging the consumer account a fee for a purchase initiated by the customer equipment, and remitting a portion of the fee to an account of the vendor. Other embodiments are disclosed.

20 Claims, 3 Drawing Sheets

U.S. PATENT DOCUMENTS

| | | | |
|---|---|---|---|
| 5,283,731 | A | 2/1994 | Lalonde |
| 5,329,589 | A | 7/1994 | Fraser |
| 5,394,324 | A | 2/1995 | Clearwater |
| 5,446,489 | A | 8/1995 | Egendorf |
| 5,535,383 | A | 7/1996 | Gower |
| 5,557,518 | A | 9/1996 | Rosen |
| 5,590,197 | A | 12/1996 | Chen |
| 5,594,225 | A | 1/1997 | Botvin |
| 5,715,314 | A | 2/1998 | Payne |
| 5,724,424 | A | 3/1998 | Gifford |
| 5,727,163 | A | 3/1998 | Bezos |
| 5,729,594 | A | 3/1998 | Klingman |
| 5,737,414 | A | 4/1998 | Walker |
| 5,745,556 | A | 4/1998 | Ronen |
| 5,802,497 | A | 9/1998 | Manasse |
| 5,819,092 | A | 10/1998 | Ferguson |
| 5,822,737 | A | 10/1998 | Ogram |
| 5,826,241 | A | 10/1998 | Stein |
| 5,845,265 | A | 12/1998 | Woolston |
| 5,845,267 | A | 12/1998 | Ronen |
| 2003/0163420 | A1 | 8/2003 | Egendorf |
| 2004/0039699 | A1 | 2/2004 | Egendorf |
| 2006/0178988 | A1 | 8/2006 | Egendorf |
| 2008/0177657 | A1 | 7/2008 | Egendorf |
| 2008/0177658 | A1 | 7/2008 | Egendorf |
| 2008/0183620 | A1 | 7/2008 | Egendorf |

FOREIGN PATENT DOCUMENTS

| | | |
|---|---|---|
| JP | 05-014510 | 1/1993 |
| JP | 08-291889 | 10/1994 |
| JP | 07-056888 | 3/1995 |
| WO | 97/03141 | 1/1997 |
| WO | 97/03410 | 1/1997 |
| WO | 97/40615 | 10/1997 |
| WO | 97/41586 | 11/1997 |
| WO | 98/19260 | 5/1998 |
| WO | 00/67170 | 11/2000 |

OTHER PUBLICATIONS

"First Virtual Internet Web Site" http://www.fv.com. downloaded Jul. 29, 1996. Authors unknown, "Information About First Virtual", esp. Payment System Summary, Buying Complete Details.

"Into the Cyberspace", Credit Card Management, v7, No. 11, issued Feb. 1995, p. 34+, see entire document.

"New Line for SBA. Family and Home Office Computing, V.12, N. 4, Apr. 1994".

AT&T, "NetWare Connect Services—White Paper", 1994.

Blankenhorn, "Building the Tools for Web Commerce, Interactive Age, V2, N 8, p. 34+, Feb. 13, 1995", Trusted Intermediaries Section.

Blankenhorn, "Virtual Mall Opens in Cyberspace, Newsbytes, Jun. 20, 1994".

Bowers, R., "First Virtual Creates Corporation of Future", Newsbytes New Network, Stillwater: Jun. 28, 1995.

Bowers, R., "First Virtual Offers Unique Internet Payment System", Newsbytes news Network; Still Water, Jun. 23, 1995.

Bremmer, "Guide to Database Distribution", Legal Aspects and Model Contracts, 2nd Ed., National Federation of Abstracting and Information Services, Chs. 3, 4 and 6, 1994 Into the Cyberspace, Credit Card Management v.7, n11, p. 34 +, Feb. 1995.

Carnegie Mellon University, "Internet Billing Server Prototype Scope Document INI Technical Report 1993-1", Oct. 14, 1993.

Cats-Baril, et al., "The French Videotex System Minitel: A Successful Implementation of a National Information Technology Infrastructure", The French Minitel System, MIS Quarterly, Mar. 1994, 1-20.

Comdex, "*Netcraft Corporation v. AT&T Mobility LLC*", Transcript of Audio September Presentation; vol. 1, Sep. 4, 2009, 1-21.

Cummings, "Internet Service Providers to Ride a Familiar Roller Coaster", Business Communications Review. V.25, N. 1, pp. 67-68, Jan. 1995.

Day, Jacqueline, "Industry Players in hot Pursuit of Secure Internet Transaction Mode", Bank Systems & Technology, vol. 32, No. 1, pp. 6, Jan. 1995.

Fogarty, "Novell Technology to Make Internet Access Intuitive", Network World, Dec. 19, 1994, 23.

Fourner, et al., "French Videotex Experience", Alcatel French Pit; International Switching Symposium, vol. 2 of 4, Mar. 17, 1987, 1-7.

Gifford, et al., "Payment Switches for Open Networks", IEEE Computer Society Press, Los Alamitos, CA, Mar. 5-9, 1995, 1-7.

Goradia et al., "NetBill 1994 Prototype, Carnegie Mellon University, 91 pages".

House, et al., "The Development of Information Services in France: The Case of Public Videotex", International Journal of Information Management, 1991, 35-54.

Infoworld, "The Voice of Personal Computing in the Enterprise", Jun. 20, 1994, 1-4.

Knowles, Anne, "Improved Internet Security Enabling On-line Commerce (new services based on Secure Hypertext Transfer Protocol, Secure Sockets Layer Standards)", PC Week, vol. 12, No. 11, 2 pages, Mar. 1995.

Marrinan, M., "First Union, Open Market Hit the Internet", Bank System+Technology; New York, vol. 2, No. 5, May 1995.

Meece, M., "Start-Ups Offers Payment System for Data Bought Over Internet Series: 1", American Banker; New York, NY, vol. 159, No. 203, Oct. 20, 1994.

Murthy, "Minitel—A Home Retailing Application", 1993, 1-20.

O'Mahony, D., "Electronic Payment Systems", Section 6.1—Ecash, pp. 145-187, Artech House, Inc., 1997.

Paul, "Database and Bulletin Board Services: A Guide to On-line Resources", Quill. v81, n7, p. 18(3), Sep. 1993. See second and third pages.

Press, L., "Commercialization of the Internet", Communications of the ACM, vol. 37, No. 11, pp. 17-21, Nov. 1994.

Rodriguez, K., "Cyberspace Start-Ups Offer Intert Wares", Inforworld; Framningham, Oct. 24, 1994.

Singleton, ,"Cash on the Wirehead", 9th Section on First Virtual, Byte, vol. 20, No. 6, Jun. 1995.

Singleton, "Cash on the Wirehead: You Can't Do Business on the Internet if you Can't Pay Your Bills or Get Paid, Here's How", BYTE, p. 71, vol. 20, No. 6, Jun. 1995.

Sirbu, "Internet Billing Service—Design and Prototype Implementation", IMA Intellectual Property Project Proceedings, vol. 1, Issue 1, Jan. 1994, 1-19.

Sirbu, et al., "Netbill: An Internet Commerce System Optimized for Network-Delivered Services", IEEE Personal Communications, vol. 2, No. 4, p. 34, Aug. 1995.

Wiegers, "First Virtual Really Pays Bills", Business Journal, issued Dec. 26, 1994, v12, No. 40, p. 1(2), see entire document.

Willis, A., "Internet Payments—The Issues", Aslib Proceedings, vol. 47, No. 11/12, p. 241, Nov./Dec. 1995.

www.fv.com, "Information About First Virtual", First Virtual World Wide Web Site, esp. Payment System Summary—Buying—Complete Details, Jul. 29, 1996.

INTERNET BILLING METHOD

CROSS REFERENCE TO RELATED APPLICATIONS

This application is a continuation of U.S. patent application Ser. No. 13/031,461, which was filed on Feb. 21, 2011 and now pending, which is a continuation of U.S. patent application Ser. No. 11/928,733, which was filed on Oct. 30, 2007 now U.S. Pat. No. 7,917,436, which is a continuation of U.S. patent application Ser. No. 11/397,204, which was filed on April 4, 2006 and now abandoned, which is a continuation of U.S. patent application Ser. No. 10/238,762 filed Sep. 10, 2002, which is a continuation of U.S. patent application Ser. No. 09/975,839 filed Oct. 11, 2001 now U.S. Pat. No. 6,976,008, which is a continuation of U.S. patent application Ser. No. 09/568,925 filed May 11, 2000 now U.S. Pat. No. 6,351,739, which is a continuation of U.S. patent application Ser. No. 09/057,230 filed Apr. 8, 1998 now U.S. Pat. No. 6,188,994, which is a continuation of U.S. patent application Ser. No. 08/499,535 filed Jul. 7, 1995 now U.S. Pat. No. 5,794,221. The contents of each of the foregoing U.S. Patent Applications and issued patents are hereby incorporated by reference into this application as if set forth herein in full.

BACKGROUND OF THE INVENTION

The present invention relates to a method of billing for commercial transactions over the Internet.

The Internet is a vast worldwide interconnection of computers and computer networks. The Internet does not consist of any specific hardware or group of connected computers, rather it consists of those elements that happen to be interconnected at any particular time. The Internet has certain protocols or rules regarding signal transmission and anyone with the proper hardware and software can be part of this interconnection.

At present, the technical and financial requirements for connecting directly to the Internet are beyond the resources of most individuals and thus new businesses known as Internet access providers have proliferated. These providers invest in the equipment needed to provide access to the Internet for subscribers who pay the providers a fee for the access. Providers include companies whose only business is to offer connection to the Internet, as well as on-line services such as Compuserve, American On-Line, and Prodigy. In addition, telephone companies and cable television companies have announced plans to provide Internet access. A party desiring to connect to the Internet by means of a provider typically connects via a modem over a telephone network to the provider's equipment which then connects the party, through the provider's equipment, to the Internet.

Although the origin of the Internet was for military use, today the primary users of the Internet are civilian. There is great activity at present attempting to utilize the Internet as a channel of commerce.

Many vendors advertise their products and services over the Internet and solicit orders from Internet users for these wares. While the preferred mode of payment is by credit card, there is great reluctance to transmit credit card account information over the Internet because of lack of security. Moreover, in situations wherein the transaction amount is small—from pennies to a few dollars-it is not economically feasible to use a credit card transaction. There is a need to be able to ensure that commercial transactions over the Internet are at least as secure as conventional transactions over the telephone, through the mails, and with on-line services where credit cards and/or billing accounts are used for purchases. Similarly, there is a need to be able to handle on the Internet a large number of small-sized transactions, similar to what is done by telephone companies for conventional telephone service.

The lack of security and the lack of a means to bill for small transactions are the biggest obstacles to commercial use of the Internet.

SUMMARY OF THE INVENTION

The main object of the present invention is to create a new business opportunity for telephone companies, cable television companies, existing Internet access providers, and companies offering financial services by creating a way for them to offer to their subscribers a method of securely buying and selling goods and services of any value over the Internet.

Another object of the present invention is an Internet billing method which is cost effective for transactions having transaction amounts ranging from pennies to a few dollars.

Still another object of the present invention is to provide a secure method of billing commercial transactions over the Internet.

A further object of the present invention is an Internet billing method which is simple to use from both the customer's point of view and that of vendors on the Internet.

Yet another object of the present invention is a billing method which can be used by a large number of existing Internet users without requiring major changes in how the users customarily behave and conduct commercial transactions.

These and other objects and advantages of the present invention are achieved by an Internet billing method in accordance with the present invention. A provider establishes an agreement with a customer, and a second agreement with a vendor, wherein the provider agrees with the customer and the vendor to bill for products and services purchased over the Internet by the customer from the vendor. Associated with the customer agreement are one or more billing accounts to which purchases may be charged. Associated with the vendor agreement are one or more methods of remitting funds to the vendor. The provider creates access to the Internet for the customer through the provider's equipment. When the customer orders a product or service over the Internet from the vendor, the provider obtains transactional information transmitted between the customer and the vendor including a transaction amount relating to the ordered product or service and the provider then bills the transaction amount to a customer billing account and remits a portion of the transaction amount to the vendor.

Which accounts are used may be specified in the agreements made between the provider and the customer and between the provider and the vendor, or may be specified in the transactional information. If specified in the transactional information, the selection of account can be made by referencing the type of account (e.g., "VISA", "phone bill"), or the position of that account on a predetermined list (e.g., "the 3rd account"), and does not require that any actual account numbers be transmitted.

By the use of this method, there is no need for the customer to transmit over the Internet any information containing any of the customer's billing account numbers thereby maintaining the security of that information.

The present invention, in a preferred embodiment, is a method of providing merchants with the ability to offer their customers secure transactions for the purchase of goods and services of any value over the Internet, without the need for the customer to transmit any credit card or other account numbers over the Internet, without the need for the customer to sign up with any additional provider of services, and without the need to change the manner in which most customers currently use the Internet.

In accordance with the present invention, a customer desiring to purchase goods and services over the Internet has prearranged access to the Internet through the services of an Internet access provider. Such providers can be, for example, companies whose only business is to offer connection to the Internet, companies which offer on-line computer services, one of which is connection to the Internet, cable television companies, or telephone companies. In arranging for access with such a provider, the customer has agreed with the provider on a method of payment which is, for example, by billing, or charge to a credit card, or charge to an account of the user which could be an account specific to the Internet or could be a more general account, such as an on-line computer services account, a cable television account, a telephone account, or a bank account.

Once the prearrangements have been completed, using the provider's service to connect to the Internet typically involves calling a telephone number of the provider and being automatically connected through the provider's equipment to the Internet.

Once connected to the Internet, the customer can browse around until an item is located that the customer wishes to purchase, at which time the customer will follow the instructions created by the vendor, exchange transactional information, and ultimately agree to purchase something by taking an appropriate action. In the course of making the purchase, the means of delivery of the goods or service will be established. Depending on the type of goods, delivery can be made, for example, by mail (e.g., in the case of a purchase of a book), by courier service (e.g., in the case of a purchase of flowers), or by electronic transmission over the Internet (e.g., in the case of delivery of an electronic newsletter or piece of software). The remaining element of the purchase transaction is the manner in which the customer pays the vendor.

In accordance with the present invention, the provider has made arrangements with vendors who wish to sell goods and services over the Internet to the customers of the provider. The provider agrees to do the billing associated with such sales for the vendors, and as part of the agreement, the provider and the vendor have agreed on the manner in which the provider will remit funds to the vendor. Examples of payment include payment by check, credit to the vendor's credit card merchant account, or credit to another account of the vendor's, such as the vendor's cable television account, telephone account, or bank account. The account of the vendor to be credited need not be with the provider. The arrangements that are made will depend on the vendor's desires and the capabilities of the provider. For example, if the vendor anticipates many small transactions and the provider is a telephone company, they can agree that the provider will credit the vendor's existing telephone account for amounts under some nominal amount and credit the vendor's credit card merchant account for larger amounts. If the vendor anticipates large transactions, then they may agree that the provider will pay by check or direct credit to the vendor's bank account.

In a typical transaction in accordance with the present invention, from the customer's point of view all use of the Internet appears to be conventional. Depending upon the prearrangements made between the provider and the customer and between the provider and the vendor, the customer can charge a purchase, for example, to a credit card, to a cable television account, to a telephone account or to a bank account. The account of the customer to be billed need not be with the provider. For example, the customer may be using one telephone company as an access provider and a second telephone company as a telephone service provider and the account to be billed is that with the second telephone company. The customer specifies which account is to be billed by an indication to the provider, but neither the customer nor the vendor has to transmit any account numbers over the Internet, because it is the provider, not the vendor, who submits the charge to the credit card company, the cable television company, the telephone company, or to another account of the customer, or who debits the bank account of the customer, and the provider already has been given, during the course of making prearrangements with the customer and the vendor, the appropriate account numbers of both the customer and the vendor. The provider sends this information to the appropriate party, and may do so by the same secure means customarily used for similar transactions not made over the Internet.

From the vendor's point of view, the transaction is as secure as a transaction made over the telephone with a credit card. If the vendor wishes, the vendor may verify with the provider that the address supplied by the customer for shipment of the goods has been authorized by the customer in the same manner in which such verification would be made for the same transaction made over the telephone with a credit card. In addition, because such a verification does not require the transmission of any account numbers of the customer, the verification can be done over the Internet as part of the transaction transmission itself if the provider and the vendor have prearranged to do so.

From the provider's point of view, the provider is made aware that the customer has authorized the charge by monitoring the data being sent over the Internet through the provider's equipment between the customer and the vendor.

This can be done, for example, by specifying a specific code which, when sent between the customer and the vendor, indicates to the provider that a transaction has been completed. When the customer has made a purchase, the provider charges the transaction amount to the agreed account of the customer and remits the agreed portion of that amount to the vendor, keeping the differential as the provider's charge for making the service available.

These and other features and advantages of the present invention will become apparent from the following detailed description of the invention with reference to the attached drawings, wherein:

DETAILED DESCRIPTION OF THE INVENTION

Figure 1:
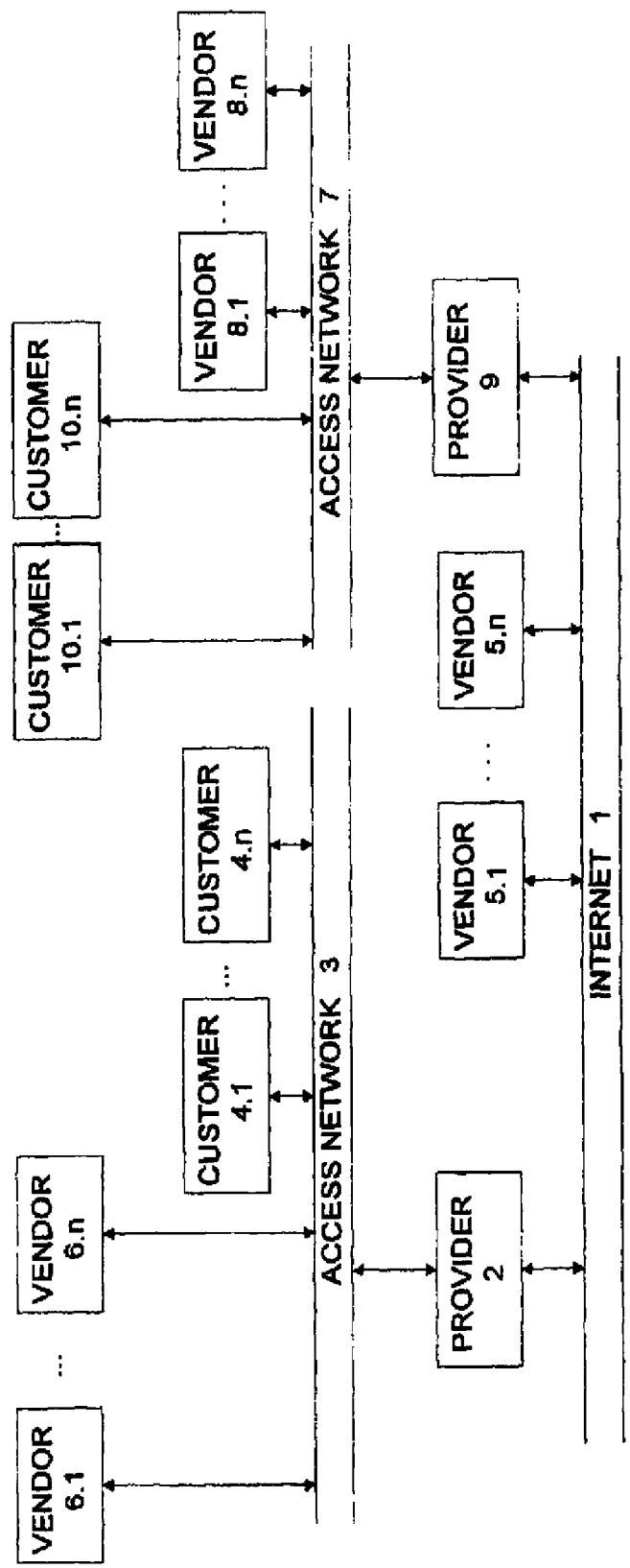
FIG. 1 is a block diagram of a system for carrying out the billing method according to the present invention.

Referring to FIG. 1, a system for carrying out the method of the present invention is shown. In that system, the Internet is shown schematically as network 1 to which providers 2, 9, vendors 5.1-5.n, 6.1-6.n and 8.1-8.n, and customers 4.1-4.n and 10.1-10.n (where n is an integer to indicate a range from one to many) are connected in different ways.

Provider 2 is connected to access network 3 and the Internet 1 and provides access to the Internet 1 for customers 4.1-4.n and vendors 6.1-6.n connected to access network 3.

Access network 3 can be a telephone network, a cable television network, an on-line services network such as Compuserve, American On-Line, or Prodigy, or a private Internet access network. Similarly, provider 9 is connected to access network 7 and the Internet 1 and provides access to the Internet 1 for customers 10.1-10.n and vendors 8.1-8.n. Vendors 5.1-5.n access the Internet directly by their own equipment.

Figure 2:
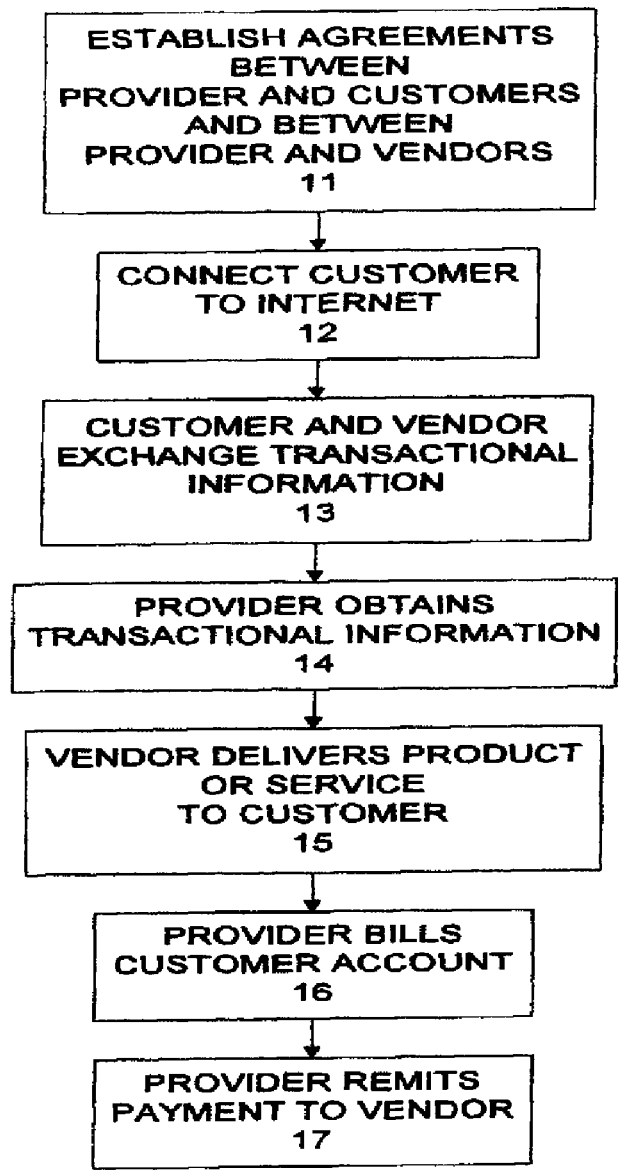
FIG. 2 is a flow chart of one embodiment of the method according to the present invention.

In accordance with the method shown in the flow chart of FIG. 2, for example, in step 11 provider 2 establishes agreements with vendors 5.1-5.n who are connected directly to the Internet, with vendors 6.1-6.n who access the Internet via access network 3 and provider 2, and with vendors 8.1-8.n who are connected to the Internet 1 via access network 7 and provider 9, to bill customers 4.1-4.n for goods and services purchased by them over the Internet from vendors 5.1-5.n, 6.1-6.n and 8.1-8.n. Provider 2 also agrees to remit a portion of the collected money back to the vendors. Provider 2 also establishes an agreement with each of customers 4.1-4.n. These agreements provide that the provider will bill the customer for goods and services purchased by them over the Internet. The billing will be done to billing accounts established in connection with the agreements. The billing accounts can be, for example, credit card accounts, telephone accounts, cable television accounts, on-line services accounts, or bank accounts. The accounts need not be with the provider if the provider has a billing agreement in place with the party with whom the account was established.

As part of the services of the provider to customers 4.1-4.n, the customer is connected to the Internet 1 in step 12 at a desired time, typically by making contact via modem. Once connected to the Internet, the customer can interface with anyone of vendors 5.1-5.n, 6.1-6.n and 8.1-8.n in order to find out about products or services offered by those vendors.

When one of customers 4.1-4.n makes the decision to order a product or service from one of vendors 5.1-5.n, 6.1-6.n and 8.1-8.n, in step 13 an exchange of transactional information occurs between the customer and the vendor. This exchange may include identifying information relating to the customer, such as the customer's Internet address, information relating to the products or services to be purchased, including the transaction amount, the manner and time of delivery, and a reference number to identify the order. The vendor or the customer also can produce a verification code signifying that a transaction has been completed which can be received by provider 2.

In step 14, the transactional information is obtained by provider 2. The communication can be a separate transmission by the vendor or the customer to provider 2, or provider 2 can extract the information from the exchange of information taking place between the customer and the vendor through equipment of provider 2. Provider 2 can then send verifying information to one or both of the customer and vendor to indicate that the transaction has been approved, if approval of a third party, such as credit card company, is required. Most importantly, the entire transaction takes place without the need of communicating the customer's credit card or other account number over the Internet 1.

The product or service is delivered to the customer in step 15 and the appropriate customer account is billed by provider 2 in step 16. Provider 2 then remits the agreed payment in the appropriate manner to the vendor in step 17, keeping the differential as a service charge for the services rendered by provider 2. Steps 15, 16 and 17 may be performed in any order.

Figure 3:
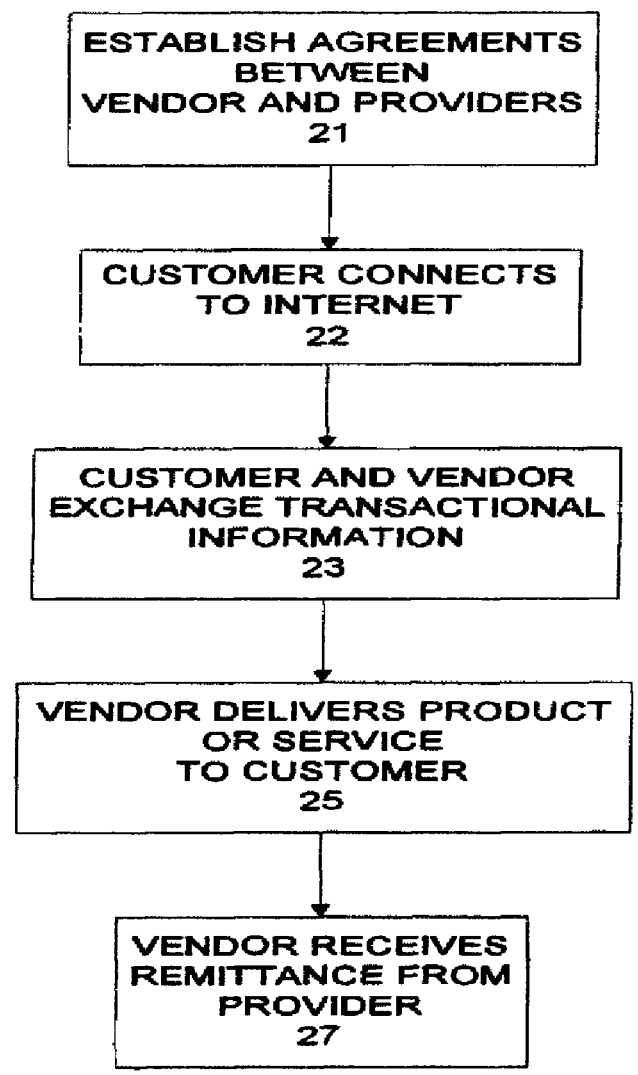
FIG. 3 is a flow chart of another embodiment of the method according to the present invention.

As can be seen from FIG. 1, the method according to the present invention can be carried out in many ways. For example, referring to FIG. 3, vendor 5.1 in step 21 can establish remitting agreements with provider 2 and provider 9 to remit to vendor 5.1 a portion of a transaction amount billed to the billing account of anyone of customers 4.1-4.n and 10.1-10.n.

Similarly, each of vendors 6.1-6.n can establish a remitting agreement with provider 9 for transactions carried out over the Internet between each of vendors 6.1-6.n and customers 10.1-10.n.

A customer connects to the Internet in step 22. The customer exchanges transactional information with the vendor in step 23 and the vendor delivers a product or service to the customer in step 25, either before or after the vendor receives remittances from the provider in step 27.

In accordance with another feature of the present invention, prior to the billing of the transaction amount to the account of the customer, and after obtaining the transactional information, the provider can obtain approval from a third party to bill the transaction amount to the billing account. This is particularly true in the case where the billing account is a credit card account or a bank account. In that instance, approval must be obtained from a third party, i.e., the bank issuing the credit card or with whom the bank account was established. Where the account is with the provider, approval would be obtained from the provider itself. In a preferred embodiment of the present invention, the approval can be obtained over the Internet and most preferably during the communication between the customer and the vendor.

In accordance with a further feature of the present invention, the customer can specify a particular billing account, for example, a credit card account, a bank account, a telephone number account, a cable television account or an on-line services account at the time that the billing agreement is established with the provider. The specification can provide that one account will be used for certain transactions, and a different account for other transactions, for example, a telephone account for transactions less than $5.00, and a bank account for transactions of at least $5.00. Thereafter, whenever the transaction amount is to be billed, it will be billed to that specified billing account. Alternatively, the customer can specify a plurality of billing accounts, for example, an AMEX account, a VISA account, a Mastercard account at the time that the billing agreement is established. When the transactional information is communicated, it will include an identification of which of those plurality of billing accounts the customer wants billed, without, however, specifying the account number of the account. Thus the customer can merely indicate the account by the "brand" name AMEX, VISA or Mastercard or the customer can identify it as the first account, second account or third account on a list previously established with the provider.

As noted above, the billing account is not necessarily with the provider, that is, it can be with a third party such as a bank issuing a credit card, or a bank at which the customer has a bank account. Alternatively, the provider can be a first telephone company, but the billing account can be with a second telephone company and charged by the first telephone company to the telephone number account of the customer with the second telephone company, as is customarily done in connection with conventional telecommunications services.

In accordance with the invention, the remitting can be by means of sending money or by crediting a vendor account such as a credit card merchant account, a bank account, a telephone number account, a cable television account or an on-line services account.

In a preferred embodiment of the present invention, the step of establishing the remitting account comprises specifying a particular vendor account to which the portion of the transaction amount will be remitted. The specification can provide that one account will be used for certain transactions, and a different account for other transactions, for example, a telephone account for transactions less than $5.00, and a bank account for transactions of at least $5.00. In an alternative embodiment of the present invention, the step of establishing the remitting agreement comprises the vendor specifying a plurality of vendor accounts to which a portion of the transaction account can be remitted. Thus when the transactional information is communicated, the vendor can identify which one of the plurality of vendor accounts the amount is to be remitted to without, however, specifying the specific account number.

The vendor account can be an account with the provider or an account with a third party such as a credit card merchant account, or bank account, with a bank, or a cable television account with a cable television company.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A method comprising:
   receiving customer account information for establishing an account to which purchases are chargeable to the account by a service provider, the customer account information being received by network equipment of the service provider;
   establishing the account utilizing the customer account information, the account being maintained by the service provider;
   providing instructions from the network equipment of the service provider that enable customer equipment to initiate purchase of an electronically-purchasable product of a vendor via a connection to the network equipment of the service provider;
   detecting a purchase initiated by the customer equipment;
   charging the account a fee for the purchase, the fee being charged in response to a communication associated with the purchase from vendor equipment of the vendor received by the network equipment of the service provider, wherein the vendor is a party other than the service provider; and
   initiating delivery of the electronically-purchasable product.

2. The method of claim 1, wherein the service provider provides telecommunication services.

3. The method of claim 2, wherein the account comprises an account for telecommunication services.

4. The method of claim 1, wherein the customer equipment communicates with the network equipment of the service provider over a computer network.

5. The method of claim 4, comprising receiving transactional information relating to the purchase from the vendor equipment via the network equipment.

6. The method of claim 5, wherein the fee is based on at least a portion of the transactional information.

7. The method of claim 5, comprising remitting a portion of the fee to the vendor.

8. The method of 1, comprising enabling the customer equipment to communicate with the vendor equipment by way of the network equipment.

9. The method of claim 1, wherein the fee is determined from information relating to the purchase.

10. The method of claim 1, comprising receiving the customer account information from the customer equipment.

11. The method of claim 1, wherein the vendor offers the electronically-purchasable products to customers of the service provider.

12. The method of claim 1, wherein third party equipment of a third party other than the vendor and the service provider initiates the charge to the account of the customer on behalf of the service provider, and wherein the third party and the service provider have an arrangement for billing customers of the service provider.

13. A method comprising:
    receiving customer account information for establishing an account to which purchases are chargeable to the account by a third party, the customer account information being received by network equipment of the third party;
    establishing the account utilizing the customer account information, the account being maintained by the third party;
    providing instructions from the network equipment of the third party that enable customer equipment to initiate purchase of an electronically-purchasable product of a vendor via a connection to the network equipment of the third party;
    detecting a purchase initiated by the customer equipment; and
    charging the account a fee for the purchase, the fee being charged in response to a communication associated with the purchase from vendor equipment of the vendor received by the network equipment of the third party, wherein the vendor is a party other than the third party.

14. The method of claim 13, wherein the third party is a service provider of communication services.

15. The method of claim 13, wherein the third party is a service provider of electronically-purchasable products of vendors.

16. The method of claim 13, comprising receiving transactional information relating to the purchase.

17. The method of claim 13, comprising remitting a portion of the fee to one of the vendor or the third party.

18. A method comprising:
    receiving customer account information for establishing an account to which purchases are chargeable to the account by a third party, the customer account information being received by network equipment of the third party;
    establishing the account utilizing the customer account information, the account being maintained by the third party;
    providing instructions from the network equipment of the third party that enable customer equipment to initiate purchase of an electronically-purchasable product of a vendor via a connection to the network equipment of the third party, wherein the vendor is a party other than the third party;
    detecting a purchase initiated by the customer equipment;
    charging the account a fee for the purchase; and
    initiating between the third party and the vendor a remittance of a portion of the fee.

19. The method of claim 18, wherein the third party is a service provider of electronically-purchasable products of vendors.

20. The method of claim 18, comprising remitting the portion of the fee to one of the vendor or the third party.

* * * * *